United States Patent Office

3,743,618
Patented July 3, 1973

3,743,618
ADHESIVE COMPOSITION HAVING LOW ADHESIVE STRENGTH WHEN WET AND HIGH ADHESIVE STRENGTH WHEN DRY
Haruhiko Arai, Narashino, Chiba, Shoji Horin, Ichikawa, Chiba, and Iwao Maruta, deceased, late of Funabashi, Chiba, Japan, by Kiyoko Maruta and Yoshi Maruta, heirs, Funabashi, Chiba, Japan, assignors to Kao Soap Co., Ltd., Tokyo, Japan
No Drawing. Filed Aug. 5, 1970, Ser. No. 61,462
Claims priority, application Japan, Aug. 8, 1969, 44/62,799
Int. Cl. C09j 3/26
U.S. Cl. 260—27 R      5 Claims

ABSTRACT OF THE DISCLOSURE

An adhesive composition comprising a high molecular vinyl compound water solubilized by being dissolved in a resin acid anionic surface active agent solution and additionally containing particles of a non-dissociative inorganic material to reduce the spinnability and improve the workability of the adhesive composition.

CROSS REFERENCES TO RELATED APPLICATIONS

U.S. patent application Ser. No. 837,341 filed June 27, 1969, now abandoned and replaced by Ser. No. 135,692, filed Apr. 20, 1971. U.S. patent application Ser. No. 867,884 filed Oct. 20, 1969, now U.S. Pat. No. 3,668,170, issued June 6, 1972. U.S. patent application Ser. No. 869,889 filed Oct. 27, 1969, now U.S. Pat. No. 3,684,749, issued Aug. 15, 1972.

BACKGROUND OF THE INVENTION

Field of the invention

This invention relates to improved adhesive compositions which have a large difference in their adhesive powers between the dry state and the wet state and which have improved workability as a result of the presence therein of water-solubilized high molecular compound as an adhesive.

Description of the prior art

Adhesives having a high adhesive power when dry and a low adhesive power when wet are desired for various purposes, including tiling with papered tiles, repapering of paper slides, wall papers, labels, etc.

With the object of obtaining adhesives suitable for such purposes, the inventors have previously invented adhesives comprising a water-insoluble high molecular vinyl compound dissolved in an aqueous solution of an anionic surface active agent (such dissolved compound being hereinafter referred to as "water-solubilized high molecular compound"). However, it has been noted that the prior adhesives are not always satisfactory in use depending upon the mode of operation. Generally water-solubilized high molecular compound adhesives possess spinnability and, accordingly, in the application of such an adhesive with a brush, the brush must be kept above the container of the liquid adhesive, after the brush is immersed in the liquid adhesive, until dropping of the liquid adhesive from the brush stops before the brush can be applied to the surface of the object to be treated. If this is not done, objects other than the object to be treated can become stained with the adhesive or a portion which is not intended to be treated with the adhesive is stained by the adhesive, owing to the spinnability of the adhesive after it is applied. After investigation for the purpose of curing these defects, the inventors have already invented adhesive compositions which have improved workability and which are prepared by adding a small amount of a water-soluble polyvalent metal salt into a water-solubilized high molecular compound system composed of a water-insoluble vinyl synthetic high molecular compound and a resin acid surface active agent. However, it has been found that the water-solubility of such a composition sometimes becomes inferior because the composition forms a polyvalent metal salt of resin acid during the production operation. In addition, such adhesives have improved workability in low speed applications such as application with a brush, but their workability in high speed applications, such as mechanized application, is still insufficient.

SUMMARY OF THE INVENTION

In this regard, after intensive investigations for the purpose of improving the workability, without necessitating the addition of polyvalent metal salts, the inventors have discovered that adhesives having excellent workability can be obtained by dispersing fine powders or colloidal particles of a non-dissociative inorganic material, such as talc, kaolin, silicic acid anhydride or another silicic acid compound, in a water-solubilized high molecular compound (solution) obtained by dissolving a water-insoluble synthetic high molecular vinyl compound in a resin acid surface active agent, and thus have achieved the present invention.

Water-insoluble synthetic high molecular compounds used as the starting materials for making the adhesives of the present invention are polyvinyl acetates (hereinafter referred to as PVAc) and derivatives thereof, polyvinyl acetals and copolymers thereof with other copolymerizable monomers, polyalkyl ($C_1$–$C_4$) acrylates, and copolymers of alkyl ($C_1$–$C_4$) acrylates with other copolymerizable monomers, etc.

There may be used PVAc and partial saponification products thereof, partial acetylation products of polyvinyl alcohol (hereinafter referred to as PVA), graft copolymers of PVA with vinyl acetate (hereinafter referred to as VAc), copolymers of VAc with copolymerizable water-soluble monomers such as vinyl pyrrolidone and maleic anhydride or with water-insoluble monomers such as ethyl acrylate, acetals of PVA with lower aliphatic aldehydes such as formaldehyde, acetaldehyde and butyl aldehyde (i.e. polyvinyl acetals) and copolymers thereof, polyethylacrylates and ethyl acrylate 2-ethylhexyl acrylate copolymers. PVA used for preparing the above acetals is not necessarily pure and may contain in its molecule an acid such as acetic acid remaining in ester linkage. PVA obtained by hydrolyzing a copolymer of vinyl acetate and another polymerizable substance, such as vinyl pyrrolidone, maleic anhydride or an acrylic ester, may be used.

The degree of polymerization of the high molecular compounds of the vinyl series should be in such a range that they are soluble in a concentrated solution of resin acid surface active agent as described below. The degree of polymerization should be at least 10, preferably in the range of 100–3000.

Resin acid anionic surface active agents are preferable for dissolving the water-insoluble high molecular vinyl compounds. Resin acid surface active agents used in the present invention are alkali metal salts of resin acids, alkali metal salts of rosin, alkali metal salts of tall oil rosin, distilled tall oil and purified tall oil, $\alpha,\beta$-unsaturated polybasic acid adducts of the above named surface active agents, such as maleic acid adducts of their alkali metal salts, and alkali metal salts of disproportionated, hydrogenated or polymerized rosin, tall oil rosin and tall oil.

The fine powders or colloidal particles of a non-dissociative inorganic material used in the present invention have particle diameters of from 1 m$\mu$ to 100$\mu$. Representative examples of them are talc, kaolin and silicic acid anhydride.

An adhesive composition is prepared by dispersing a predetermined amount of fine powders or colloidal particles of the non-dissociative inorganic material in a system of the above-described synthetic high molecular vinyl compound/resin acid surface active agent.

The mixing ratio of (1) the synthetic high molecular vinyl compound to (2) the surface active agent, in the adhesive compositions according to the present invention is generally from 10:100 to 100:10 in weight.

The amount of the non-dissociative material employed in the adhesive composition according to the present invention varies depending on the types and concentrations of the high molecular compound and the surface active agent. The improved effect according to the present invention can be obtained if the amount of the non-dissociative material is at 0.05%, based on the total amount of high molecular compound and surface active agent in the adhesive composition, preferably 1–10%. If the non-dissociative inorganic material is added in an amount higher than 100%, based on the combined weight of the high molecular compound and the surface active agent, then an undesirable reduction of the adhesive strength is observed.

A typical process for preparing the adhesive according to the present invention comprises adding a predetermined amount of a high molecular compound in the form of granules, a mass or an emulsion into a concentrated anionic surface active agent solution of resin acid (usually 10–20% aqueous solution), stirring the mixture at ambient temperature or under heating to below 100° C. to obtain a water-solubilized high molecular compound (solution), then adding therein a predetermined amount of a non-dissociative inorganic material or a dispersion thereof and mixing them with a homomixer to obtain a homogeneous dispersion.

The adhesive compositions of the present invention are aqueous solutions usually containing 5–25% by weight of solids, and they may be applied to various objects without any further treatment or in a further diluted form, if necessary.

EXAMPLE 1

Talc and kaolin were added respectively into (1) a solution of 4 parts by weight of polyvinyl butyral (acetal 62%, degree of polymerization 1,000) in 16 parts by weight of sodium rosin and 80 parts by weight of water and (2) a solution of 4 parts by weight of acetylated polyvinyl alcohol (degree of acetylation 66%, degree of polymerization 1,000) in 16 parts by weight of hydrogenated sodium rosin and 80 parts by weight of water. The compositions were applied, in the amount of 4.5 g., onto kraft papers of 30 x 30 cm.² in size with a brush.

The brush workabilities were rated. After the application, mosaic tiles of 2.5 x 2.5 cm.² in szie and 3.0 mm., in thickness were adhered to the papers. After allowing the papers to stand in a room to dry for 4 hours, the adhesive strength between the tile and the paper was measured by determining the degree (kg.) of power required for peeling off them with a measuring device.

The results are shown in Tables 1 and 2.

TABLE 1.—POLYVINYL BUTYRAL/SODIUM ROSIN SOLUTION SYSTEM

| Amount of talc added (based on the solution), percent | Workability (with a brush) | Adhesive strength (kg./2.5 x 2.5 cm.²) |
|---|---|---|
| 0 | High spinnability, poor workability | 1.24 |
| 0.2 | Fairly lowered spinnability, almost good workability. | 1.26 |
| 0.4 | Low spinnability, good workability | 1.37 |
| 0.6 | do | 1.62 |
| 0.8 | do | 1.62 |
| 1.0 | do | 1.56 |

TABLE 2.—PARTIALLY ACETYLATED POLYVINYL ALCOHOL/HYDROGENATED SODIUM ROSIN SOLUTION SYSTEM

| Amount of kaolin added (based on the solution), percent | Workability (with a brush) | Adhesive strength (kg./2.5 x 2.5 cm.²) |
|---|---|---|
| 0 | High spinnability, poor workability | 1.24 |
| 0.2 | Low spinnability, good workability | 1.34 |
| 0.4 | do | 1.37 |
| 0.6 | do | 1.35 |
| 0.8 | do | 1.29 |
| 1.0 | do | 1.17 |

EXAMPLE 2

8 parts by weight of vinyl acetate/ethyl acrylate copolymer (vinyl acetate/ethyl acrylate=1/1, degree of polymerization 1,000) were dissolved in 12 parts by weight of disproportionated sodium rosin and 80 parts by weight of water. Into the resulting solution was added calcium chloride in various amounts necessary for substituting the carboxyl group in the disproportionated sodium rosin contained in the solution, in various proportions. Colloidal silicic acid was added to each solution and the thus obtained adhesive was applied with a brush or a labelling machine at a high speed on art papers of 20 x 15 cm.² in size. The labelling machine was that of roller-coating type. The speed of movement of the labels on the roller was 40 m./mm.

The rating of the workability of each solution is shown in Table 3.

TABLE 3

| Molar percent of carboxyl group in disproportionated sodium rosin substituted by disproportionated calcium rosin | Amount of colloidal silicic acid (based on the solution), percent | Workability (with a brush) | High speed workability in roller coating |
|---|---|---|---|
| 0 | 0 | High spinnability, poor workability | High spinnability, very poor workability. |
|  | 0.2 | Fairly lowered spinnability, almost good workability. | Considerably high spinnability, poor workability. |
|  | 0.5 | Low spinnability, good workability | Considerably low spinnability, almost good workability. |
|  | 1.0 | do | Do. |
|  | 2.0 | do | Do. |
| 2 | 0 | Fairly low spinnability, almost good workability. | High spinnability, very poor workability. |
|  | 0.2 | Low spinnability, good workability | Considerably low spinnability, almost good workability. |
|  | 0.5 | Low spinnability, good workability | Low spinnability, good workability. |
|  | 1.0 | do | Do. |
|  | 2.0 | do | Do. |
| 3 | 0 | Low spinnability, good workability | Considerably high spinnability, inferior workability. |
|  | 0.2 | do | Considerably low spinnability, almost good workability. |
|  | 0.5 | do | Low spinnability, good workability. |
|  | 1.0 | do | Do. |
|  | 2.0 | do | Do. |

EXAMPLE 3

6 parts by weight of ethylene/vinyl acetate copolymer (ethylene/vinyl acetate—50/50 in weight, degree of polymerization about 1300) were dissolved in 14 parts by weight of polymeric potassium rosin and 80 parts by weight of water. Kaolin was added into the resulting solution to prepare an adhesive, which was then applied on art papers of 20 x 15 cm.² in size with a labelling machine as used in Example 2. The results are shown in Table 4.

TABLE 4

Amount of kaolin
(based on the solution),
percent:                      Workability in application
    0 _____ High spinnability, poor workability.
    0.05 _____ Considerably low spinnability, almost good workability.
    0.10 _____ Low spinnability, good workability.
    0.50 _____ Do.
    1.00 _____ Do.

The adhesive strength of each of the kaolin-incorporated adhesives on various objects was tested. Each of the adhesive samples in the amount of 60 mg. was applied on objects of an area of 2.5 x 4.0 cm.² and then the objects were placed on a kraft test paper of 2.5 x 6.0 cm.² in size. An edge of the size of 2.5 x 2.0 cm.² of the paper was left as an uncoated edge for peeling. After allowing the assemblies to dry in a room for one hour, the adhesive strength was measured by peeling off at an angle of 90 degrees gently according to the specification of JIS K0218, in order to determine the proportion of the area of the paper broken by the peeling (proportion of broken area, percent. The results were shown in Table 5.

TABLE 5.—PROPORTION OF BROKEN AREA (PERCENT)

| Objects | Amount of kaolin (based on the weight of the solution) | | | | |
|---|---|---|---|---|---|
|  | 0% | 0.05% | 0.10% | 0.50% | 1.00% |
| Paper (liner for corrugated board) | 100 | 100 | 100 | 100 | 100 |
| Wood (cinchona) | 100 | 98 | 100 | 100 | 100 |
| Stainless steel | 100 | 100 | 100 | 100 | 100 |
| Glass | 100 | 100 | 100 | 100 | 100 |
| Neoprene rubber | 100 | 100 | 100 | 100 | 100 |
| Polyvinyl chloride | 100 | 100 | 100 | 100 | 100 |
| Flame-treated polyethylene | 100 | 100 | 100 | 100 | 100 |
| Polypropylene | 100 | 100 | 100 | 100 | 100 |
| Polychlorotrifluoroethylene | 100 | 100 | 100 | 96 | 100 |
| Polystyrene | 100 | 100 | 100 | 100 | 100 |
| Acrylic resin | 100 | 100 | 100 | 100 | 100 |
| Melamine resin | 100 | 100 | 100 | 100 | 100 |
| Urea resin | 100 | 100 | 100 | 100 | 100 |
| Phenolic resin | 100 | 100 | 100 | 100 | 100 |

EXAMPLE 4

5 parts by weight of ethyl acrylate 2-ethylhexyl acrylate copolymer (ethyl acrylate/2 - ethylhexyl acrylate=3/2, degree of polymerization about 1,500) were dissolved in 15 parts by weight of hydrogenated potassium rosin and 80 parts by weight of water. A predetermined amount of colloidal silicic acid was added into the resulting solution to prepare the adhesive. The adhesive was applied in the amount of 1.5 g. on a kraft paper of 20 x 15 cm.² in size with a brush and the workability was tested. The results are shown in Table 6.

TABLE 6

Amonut of colloidal silicic
acid (based on the weight
of the solution), percent:     Workability (with a brush)
    0 _____ High spinnability, non-smooth brush-handling.
    0.1 _____ Low spinnability, smooth brush-handling.
    0.5 _____ Considerably low spinnability, almost good workability.
    1.0 _____ Do.
    10.0 _____ Do.
    30.0 _____ Do.

The adhesive power of the adhesive on various objects was tested according to the same method as in Example 3. Rate of the paper broken (proportion of broken area, percent of each case is shown in Table 7.

TABLE 7.—PROPORTION OF BROKEN AREA (PERCENT)

| Subjects | Amount of colloidal silicic acid (based on the weight of the solution) | | | | | |
|---|---|---|---|---|---|---|
|  | 0% | 0.1% | 0.5% | 1.0% | 10.0% | 30.0% |
| Paper (corrugated board) | 100 | 100 | 100 | 100 | 100 | 92 |
| Wood (cinchona) | 94 | 96 | 100 | 100 | 100 | 86 |
| Stainless steel | 100 | 100 | 100 | 100 | 100 | 48 |
| Polyvinyl chloride | 100 | 100 | 100 | 100 | 100 | 34 |
| Polypropylene | 96 | 100 | 100 | 100 | 98 | 10 |
| Polystyrene | 100 | 100 | 98 | 100 | 100 | 18 |
| Melamine resin | 100 | 100 | 100 | 100 | 100 | 50 |
| Urea resin | 100 | 100 | 100 | 100 | 94 | 32 |

The embodiments of the invention in which an exclusive property or privilege is claimed are defined as follows:

1. An adhesive composition consisting essentially of a dispersion of
   (1) an aqueous solution of a water-solubilized high molecular weight polyvinyl compound, obtained by dissolving in water,
      (a) from 10 to 100 parts by weight of a water-insoluble high molecular weight polyvinyl compound having a degree of polymerization of at least 10 and selected from the group consisting of polyvinyl acetate, partially saponified polyvinyl acetate, copolymers of vinyl acetate [and other copolymerizable monomers] with ethyl acrylate, copolymers of vinyl acetate with ethylene, partially acetylated polyvinyl alcohol, graft copolymers of polyvinyl alcohol and vinyl acetate, polyvinyl acetals [and copolymers thereof with other copolymerizable monomers, polyalkyl ($C_1$–$C_4$) acrylates and copolymers of alkyl ($C_1$–$C_4$) acrylates with other copolymerizable monomers] and copolymers of ethyl acrylate with 2-ethyl hexyl acrylate, and
      (b) from 10 to 100 parts by weight of a resin acid anionic surface active agent,
   said solution (1) having dispersed therein
   (2) from 0.05% to 100% by weight, based on the total weight of constituents (a) plus (b), of fine particles of a non-dissociative inorganic material having particle diameters in the range of 1 m$\mu$ to 100$\mu$.

2. An adhesve composition according to claim 1, in which the polyvinyl compound has a degree of polymerization in the range of 100–3000.

3. An adhesive composition according to claim 1, in which the resin acid anionic surface active agent is selected from the group consisting of (1) alkali metal salts of resin acids and maleic acid adducts of said resin acid salts (2) alkali metal salts of rosin and maleic acid adducts of said rosin salts, and (3) alkali metal salts of disproportionated, hydrogenated or polymerized rosin.

4. An adhesive composition according to claim 1, in which the weight of the particles is in the range of from 1% to 10%, by weight, based on the combined weight of the vinyl compound and the surface active agent.

5. An adhesive composition according to claim 1, in which the composition comprises about 5–25% by weight solids and the balance is water.

References Cited

UNITED STATES PATENTS

| | | | |
|---|---|---|---|
| 2,532,223 | 11/1950 | Bromley | 260—23 |
| 3,234,161 | 2/1966 | Snelgrove | 260—29.6 |
| 3,487,036 | 12/1969 | Bissot | 260—27 |

FOREIGN PATENTS

| | | |
|---|---|---|
| 894,855 | 4/1962 | Great Britain. |

DONALD E. CZAJA, Primary Examiner

W. E. PARKER, Assistant Examiner

U.S. Cl. X.R.

260—23 AC, 29.6 H

UNITED STATES PATENT OFFICE
CERTIFICATE OF CORRECTION

Patent No. 3,743,618　　　　　　　　Dated July 3, 1973

Inventor(s) Iwao Maruta et al

It is certified that error appears in the above-identified patent and that said Letters Patent are hereby corrected as shown below:

Col. 6, line 56; delete "[and".

line 57; delete "other copolymerizable monomers]".

line 61; delete "[and copolymers thereof".

lines 62-64; delete in their entirety.

line 65; delete "monomers]".

Signed and sealed this 20th day of November 1973.

(SEAL)
Attest:

EDWARD M. FLETCHER, JR.　　　　　RENE D. TEGTMEYER
Attesting Officer　　　　　　　　　　Acting Commissioner of Patents